United States Patent

[11] 3,545,555

| [72] | Inventor | George R. Cass |
| | | Montreal, Quebec, Canada |
| [21] | Appl. No. | 801,306 |
| [22] | Filed | Feb. 24, 1969 |
| [45] | Patented | Dec. 8, 1970 |
| [73] | Assignee | Canadian National Railway Company |
| | | Montreal, Quebec, Canada |
| [32] | Priority | Jan. 27, 1969 |
| [33] | | Canada |
| [31] | | No. 041,271 |

[54] METHOD AND APPARATUS FOR DYNAMICALLY WEIGHING OBJECTS IN MOTION
25 Claims, 6 Drawing Figs.

[52] U.S. Cl............................................. 177/1,
177/163, 177/210

[51] Int. Cl...................................................... G01g 19/04,
G01g 3/14
[50] Field of Search........................................... 177/1, 163,
(Railroad Motion Digest), 210, 211

[56] References Cited
UNITED STATES PATENTS
3,276,525 10/1966 Cass............................ 177/1

Primary Examiner—Robert S. Ward, Jr.
Attorney—Fetherstonhaugh & Co.

ABSTRACT: Apparatus for weighing moving objects such as railway cars, including a filter circuit having poles and zeros at approximately the lowest resonant bounce frequency of the system and optionally additional poles and zeros at a higher frequency.

3,545,555

METHOD AND APPARATUS FOR DYNAMICALLY WEIGHING OBJECTS IN MOTION

BACKGROUND OF THE INVENTION

This invention relates to improved dynamic weighing apparatus and to a new filter circuit for use therein, particularly for the weighing of moving railway cars.

In the dynamic weighing of an object (i.e. the weighing of the object while it is in motion), some means must be found, if an accurate result is to be obtained, to eliminate or compensate for the oscillatory component of the dynamic weight signal or reading caused by bouncing of the vehicle as it moves over the weigh bridge or other weighing apparatus. A simple method of reducing the oscillatory component is to integrate the instantaneous weight signal over an appropriate length of time. Simple integration of a signal is equivalent to passing the signal through a single-pole filter with the pole at a frequency of zero. Unfortunately, simple integration is insufficiently accurate for many weighing requirements. Double integration, suitable carried out, i.e. an additional integration of the integrated signal, may further reduce the oscillatory component but double integration will not yield a greatly improved signal due to the subsequent integration of the first integral's initial conditions.

A further improvement on dynamic weighing systems was proposed by the present inventor and described in U.S. Pat. No. 3,276,525 issued 4th Oct., 1966. This proposal involved the use of a filter having a pair of poles at or slightly below the lowest resonant bounce frequency that would be encountered in the moving object and weigh apparatus. Passage of the instantaneous weight signal through such a filter, in combination with simple weigh of the filter output signal, resulted in an output weight reading within the 0.15 percent margin of error tolerated by prevailing standards for many North American railways.

However, this system required that the moving railway car be on the weight bridge for a time interval of at least 3 seconds.

GENERAL DESCRIPTION OF THE INVENTION

It is an object of the present invention to improve the dynamic weighing system described in the aforesaid U.S. Pat. No. 3,376,525 by introducing an improved filter network through which the instantaneous weight signal is passed, to reduce the minimum time interval during which the moving railway car or other moving object to be weighed must be present on the weigh bridge or other weighing device, thereby to permit a reduction in the length of the weigh bridge.

According to the present invention, a filter network through which the instantaneous weight signal passes is characterized by a transfer function having a pair of zeros at or slightly below the lowest resonant bounce frequency that is encountered in the system comprising the moving object and the weighing apparatus. Preferably, the filter is designed to provide at least 4 poles at the aforesaid frequency as well as at least 2 zeros. In one preferred embodiment, the signal after passing through the filter may be simply integrated, and in another preferred embodiment a further pair of zeros and poles are provided at a frequency somewhat higher than the lowest resonant bounce frequency encountered in the system.

While in theory, the zeros of transmission that could be provided by a filter could actually attenuate the resonant frequency signal completely, the term "zeros" used herein is to be read as including low positive values of transmission slightly greater than zero. A low positive value tends to avoid the danger of introducing selfgenerated oscillations into the filter.

In the case of a railway car on a conventional weigh bridge, the lowest resonant bounce frequency encountered is of the order of three cycles per second, which is equivalent to about 20 radians per second. A filter for use in weighing apparatus according to the invention will therefore provide zeros and poles at about 20 radians per second. In the second preferred embodiment mentioned above, additional zeros and poles may be provided at about 30 radians per second. It is possible to add zeros and poles at still higher frequencies, which might slightly improve the oscillatory component reduction without appreciably increasing time required to eliminate transients, but for the purposes contemplated, such additional refinements are unnecessary and tend simply to add expense without significantly improving the accuracy of the weight measurement.

According to the first embodiment of the invention mentioned above, the filter transfer function is preferably in the form:

$$\frac{e_2}{e_1} = \frac{K_1\left(\frac{D^2}{\omega_o^2} + a\frac{D}{\omega_o} + 1\right)}{\left(\frac{D}{\omega_o} + 1\right)^4} \quad (1)$$

where $k_1$ is a known constant;

$e_2$ is the filter output voltage;

$e_1$ is the filter input voltage;

D is the differential operator;

$a$ is a constant having a value of about 0.1 or less; and $\omega_o$ is the lowest expected resonant bounce frequency (in radians per second) or is slightly below the lowest expected resonant bounce frequency, and is 20 radians per second for the weighing of railway cars.

According to the second preferred embodiment, the filter transfer function is preferably in the form:

$$\frac{e_2}{e_1} = \frac{K_2\left(\frac{D^2}{\omega_o^2} + a\frac{D}{\omega_o} + 1\right)\left(\frac{D^2}{\omega_1^2} + b\frac{D}{\omega_1} + 1\right)}{\left(\frac{D}{\omega_o} + 1\right)^6 \left(\frac{D}{\omega_1} + 1\right)^2} \quad (2)$$

where $K_2$ is a known constant;

$\omega_1$ is about 1½ $\omega_o$, or 30 radians per second for the weighing of railway cars;

$b$ is a constant having a value of about 0.1 or less; and all other symbols are as defined above with reference to equation (1).

The values $K_1$ and $K_2$, being constant multipliers, deserve no special attention, and in any event the weight signal after multiplication by these and other circuit and apparatus constants will ordinarily be multiplied by a selected constant to give a direct reading of true weight in conventional units of weight.

DETAILED DESCRIPTION OF THE INVENTION WITH REFERENCE TO THE DRAWINGS

In the discussion which follows, the weighing of a railway car will be used as an example, but it is to be understood that appropriate modifications will readily occur to those skilled in the art to adapt the exemplary apparatus and methods to be described below to the weighing of other moving objects.

Figure 1:
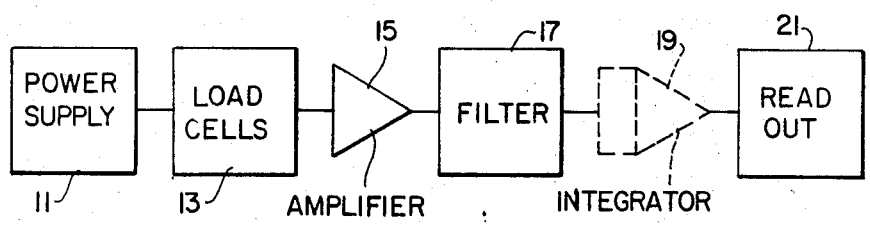
FIG. 1 is a schematic block diagram of the general arrangement of components in weighing apparatus for use in a weighing method according to the present invention.

A general discussion of the weighing of railway cars is included in the aforesaid U.S. Pat. No. 3,276,525. FIG. 1 of the present application shows an overall arrangement of the components of weighing apparatus which is substantially identical to that described in U.S. Pat. No. 3,276,525. Load cell 13 located beneath the weigh bridge over which the railway car passes are supplied with electricity from the power supply 11 and their output signal is amplified by an amplifier 15 and passed to a filter 17. A specific filter design was discussed in U.S. Pat. No. 3,276,525, but the filter 17 according to the present invention is significantly different, and will be described in greater detail below. Two preferred embodiments of a filter 17 according to the present invention will be described. With the first embodiment, an integrator 19 is preferably used to integrate the output of the filter, using simple integration, but for the second embodiment of the filter 17, the integrator 19 may be eliminated and replaced by a direct lead to the readout unit 21.

On the empirically-derived assumption that the lowest significant resonant bounce frequency encountered in the weighing of a railway car is no lower than about 3 cycles per second (approximately the equivalent of 20 radians per second), it is desired to minimize the oscillatory amplitude component of the weight signal supplied by the amplifier 15 at this lowest expected frequency. By experiment it has been found that the choice of 20 radians per second is at least as low as any bounce frequency of significance in the weighing of railway cars.

According to the proposal discussed in U.S. Pat. No. 3,276,525 a filter would be provided having a pair of poles at 5 radians per second, which was necessary, according to the design therein described, in order to give sufficient amplitude reduction at 20 radians per second to make possible an acceptably accurate final weight reading.

According to the present invention, however, the filter 17 provides both zeros and poles at 20 radians per second, which results in satisfactory oscillatory amplitude reduction over the range of bounce frequencies encountered (i.e. from 20 radians per second upwards) and additionally, because of the inclusion of the zeros as well as the poles in the filter transfer function, makes possible a reduction in the time taken to permit the initial transient conditions to dissipate fully.

As a specific example of a suitable transfer function for the filter 17 according to a first embodiment of the invention, the transfer function equation would take the form of equation (1) above, with $\omega_o = 20$ radians per second and $a = 0.07$.

A positive rather than zero value of $a$ is not theoretically necessary and in fact might be considered theoretically undesirable, because it has the effect of reducing the zeros from absolute zeros to slightly positive values. In other words, the oscillatory component of the filter output weight signal at 20 radians per second is not, for any positive value of $a$, absolutely zero but it is something slightly greater than zero. The reasons that $a$ is given a slight positive value is to avoid any possibility that $a$ will have a negative value. If $a$ were chosen to be exactly zero, the aging of components over a period of time, temperature variations, mismatches or the like might permit $a$ to become slightly negative, and a negative value would correspond physically to the creation of selfgenerated oscillations in the filter network, which are obviously undesired. Accordingly, $a$ is chosen to have a slight positive value so that even with aging of components, etc. there will be less danger that $a$ will ever become negative. A value of $a$ less than about 0.1 will in general be found satisfactory, and in a prototype of apparatus actually built, a value of $a = 0.07$ was found to be satisfactory.

It will be apparent by comparing the transfer function of equation (1) with the transfer function of the filter described in U.S. Pat. No. 3,276,525 that the poles of the filter according to the first embodiment of the present invention are at 20 radians per second, as compared with the poles at 5 radians per second in U.S. Pat. No. 3,276,525. This means that the time taken to dissipate the transient conditions substantially fully will be considerably less using the filter according to the first embodiment of the present invention. Suppose, for example, that the filter is considered to dissipate the transient conditions fully when the transient conditions fully when the transient term in the equation is multiplied by the reciprocal of the base of natural logarithms taken to the tenth power (this has been found to be an acceptable condition in practice). Then if the poles are at 5 radians per second, it will take 2 seconds to dissipate the transient conditions fully according to this test. On the other hand, using the filter according to the first embodiment of the present invention, it will take only a little longer than ½ second to dissipate the transients. A four fold improvement in time is not quite realized because of the greater number of poles involved.

Furthermore, the relative reduction in amplitude of the oscillatory component is superior in the filter according to the first embodiment of the present invention as compared with the filter described in U.S. Pat. No. 3,276,525. The reduction in the oscillatory component with a value of $a = 0.07$ is plotted in FIG. 2. It will be noted that the "zero" of the curve appears at a frequency $\omega_o$ equal to 20 radians per second. The peak of the curve at frequencies above $\omega_o$ occurs at about 2 $\omega_o$ at which the output oscillatory component is only about 0.12 times the value of the input oscillatory component. In practice, when weighing railway cars, it has been found that the input oscillatory component of the weight signal is at the very most about 20 percent of the true weight signal. Thus, the relative amplitude of the oscillatory component as compared with the true weight signal after passing through the filter according to the first embodiment of the present invention is about 0.024. After integration by the simple integrator 19, the oscillatory component is further reduced by a factor of about 20, giving a maximum error in the true weight signal caused by the oscillatory component of about 0.12, percent less than the 0.15 percent permitted by regulation.

Furthermore, the time required for the integration is greatly reduced as compared with the time required for integrating the output of the filter network discussed in U.S. Pat. No. 3,276,525. It has been determined that integration over 0.8 seconds is sufficient integration time, and if this is added to the 0.5 seconds required to dissipate the transient conditions, it will be found that 1.3 seconds of total scale-borne time is all that is required for an accurate dynamic weighing of a railway car. Even if a margin of error of an extra 0.2 seconds is allowed, the time required to complete the weighing is only half that required using the apparatus described in U.S. Pat. No. 3,276,525. This would permit a reduction in the length of the weigh bridge or an increase in speed of the railway car across the weigh bridge. Generally speaking, because of the high cost of construction of weigh bridges, it is preferred to reduce the length of the weigh bridge rather than to increase the speed of the railway cars, particularly because other railway yard facilities are generally not capable of handling railway cars as fast as the present invention would permit.

However, if a railway car is to be weighed while completely on the bridge, the bridge must be long enough to accommodate both trucks supporting the railway car so that during the entire weighing operation both trucks are simultaneously on the weigh bridge. Since the present invention permits weighing speeds fast enough to reduce the weigh bridge length to a length shorter than the distance between the trucks of the longest freight cars in use, it has been necessary, to take full advantage of the invention, to devise a method for weighing the freight cars one truck at a time and then adding the total of the readings for the two trucks to obtain the true weight of the railway car. This technique and apparatus suitable for carrying it out, will be described below with reference to FIG. 6 of the drawings.

Figure 3:
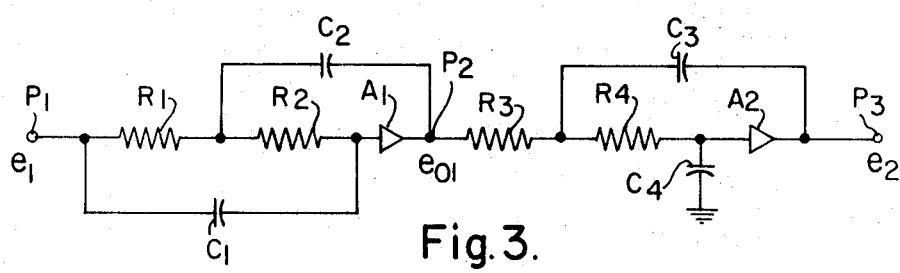
FIG. 3 is a circuit diagram (in linear form) of an active filter network constructed in accordance with the first embodiment of the present invention.

FIG. 3 shows an example of an active filter network that with appropriate choice of circuit values, is characterized by a transfer function of the form set out in equation 1. The active filter network comprises resistors R1, R2, R3, and R4, capacitors C1, C2, C3 and C4, and operational amplifiers A1 and A2 connected as shown in the drawing. The output of amplifier 15 of FIG. 1 is applied to the input terminal P1 of the active filter network, and the output of the filter at terminal P3 is passed to the integrator 19.

If the value $a$ in equation 1 is taken to be 0.07, then the following circuit values should be used in order to obtain the required transfer function:

Conductance $g_1$ of resistor R1 = 4 $\mu\nu$.
Conductance $g_2$ of resistor R2 = 10 $\mu\nu$.
Conductance $g_3$, $g_4$ of each of resistors R3 and R4 = 40 $\mu\nu$.
Capacitance $c_1$ of capacitor C1 = .01 $\mu f$.
Capacitance $c_2$ of capacitor C2 = 10 $\mu f$.
Capacitance $c_3$, $c_4$ of each of capacitors C3 and C4 = 2 $\mu f$.
Gain $KA_1$ of amplifier A1 = 0.9614.
Gain $KA_2$ of amplifier A2 = 1.

The network of FIG. 3 can be subdivided into two discrete components the first of which includes the elements positioned between terminals P1 and P2, and the other of which includes the elements on the right-hand side of terminal P2. The transfer function of the left-hand subcircuit lying between the terminals P1 and P2 is expressed in the following form:

$$\frac{e_{o_1}}{e_1} = KA_1 \cdot \frac{D^2 \frac{c_1 c_2}{g_1 g_2} + D \frac{c_1}{g_1}\left(\frac{g_1+g_2}{g_2}\right)+1}{D^2 \frac{c_1 c_2}{g_1 g_2} + D \frac{c_1}{g_1}\left(\frac{g_1+g_2}{g_2}\right)+\frac{Dc_2}{g_1}(1-K_1)+1} \quad (3)$$

where $e_{o_1}$ is the voltage at terminal P2, $e_1$ is the voltage at perminal P1, and the other symbols are as previously defined.
Equation (3) reduces to:

$$\frac{e_{o_1}}{e_1} = \frac{\frac{D^2}{(20)^2}+\frac{.07D}{20}+1}{\left(\frac{D}{20}+1\right)^2} \cdot KA_1 \quad (4)$$

The transfer function of the right hand subcircuit can be expressed as follows:

$$\frac{e_2}{e_{o_1}} = \frac{1}{D^2 \frac{c_3 c_4}{g_3 g_4}+\frac{Dc_4}{g_4}\frac{(g_3+g_4)}{g_3}+1} \quad (5)$$

where $e_2$ is the voltage at terminal P3, and the other symbols are previously defined.
Equation (5) reduces to:

$$\frac{e_2}{e_{o_1}} = \frac{1}{\left(\frac{D}{20}+1\right)^2} \quad (6)$$

From the above, it can be seen that the left hand subcircuit provides two poles and two zeros at 20 radians per second while the right hand subcircuit provides two poles at 20 radians per second.

Thus, the overall transfer function for the filter is $$\frac{e_2}{e_1} = \frac{e_{o_1}}{e_1} \cdot \frac{e_2}{e_{o_1}} = KA_1 \cdot \frac{\frac{D^2}{(20)^2}+\frac{.07D}{20}+1}{\left(\frac{D}{20}+1\right)^4}$$

which is the desired transfer function according to equation (1).

The active filter network of FIG. 3 is rather simply devised, and other equally effective active filter networks could be devised, but a person skilled in the art may prefer to devise a passive filter network. Provided that the passive filter network is characterized by a transfer function of the required form, a passive network could be used. It will probably be found that an inductor is required in a passive filter network, and thus there may be more difficulty in obtaining satisfactory components at a reasonable cost if a passive network is used.

Figure 2:
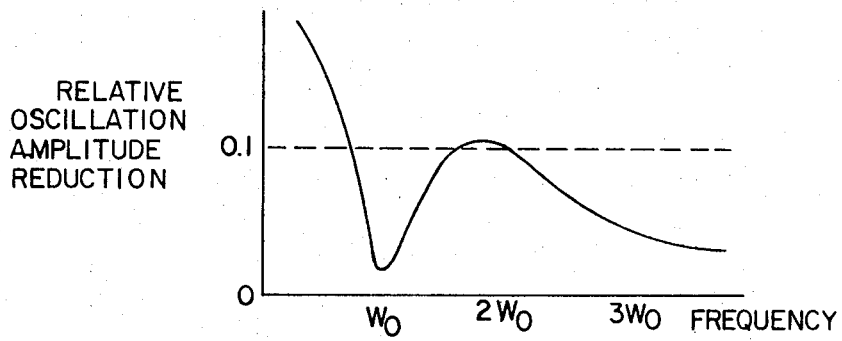
FIG. 2 is a graph showing an exemplary reduction in the amplitude of the oscillatory component of the weight signal after passage through a filter constructed in accordance with a first embodiment of the present invention.

From a study of FIG. 2, it will be observed that there is quite satisfactory attentuation of the oscillatory component at a frequency of $\omega_o$ but the attentuation is less at higher frequencies, particularly at about 2 $\omega_o$. According to a second preferred embodiment of the present invention, a filter network is provided having additional poles and zeros at a frequency higher than $\omega_o$. In designing this second filter, it was desired to eliminate the need for the integrator 19 of FIG. 1 and it was found that a further pair of poles and pair of zeros at a frequency of 30 radians per second, and an additional pair of poles at 20 radians per second, over and above the poles and zeros provided by filter network according to the first embodiment of the invention, were satisfactory to give the desired accuracy, elimination of undesired transient signals, and elimination of the integrator 19. The transfer function of a filter according to the second embodiment of the invention takes the form of equation (2) above, with $\omega_o = 20$ radians per second, $\omega_1 = 30$ radians per second, and $a = b = 0.07$.

Figure 4:
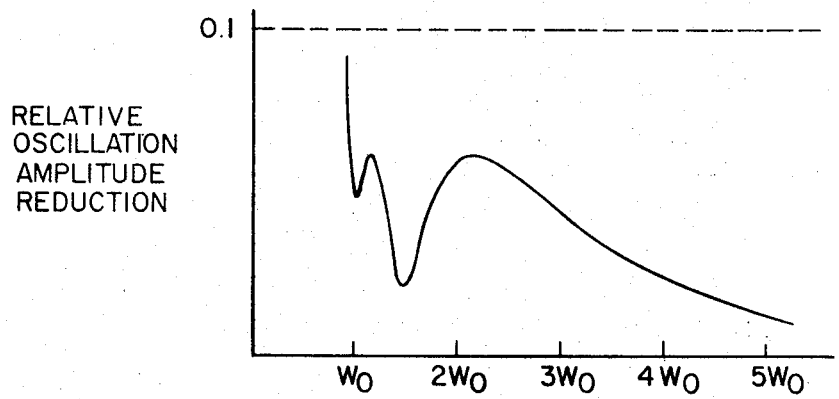
FIG. 4 is a graph showing an exemplary reduction in the relative oscillatory component of the weight signal after passage through a filter constructed in accordance with a second embodiment of the present invention.

The frequency response of such a filter is illustrated in the graph of FIG. 4, which shows the relative reduction in the oscillatory component as a function of frequency. Again it will be observed that there is an approximate "zero" at a frequency of 20 radians per second and that additionally there is another more pronounced "zero" at a frequency of 30 radians per second in the example under consideration.

Figure 5:
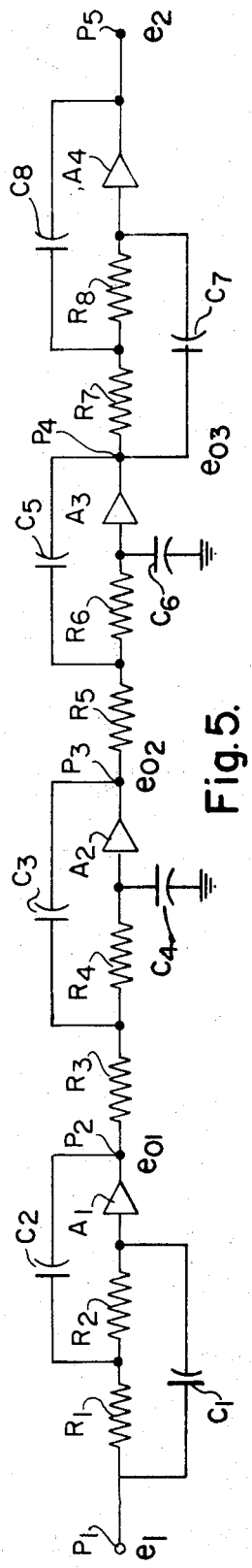
FIG. 5 is a circuit diagram (in linear form) of an active filter network constructed in accordance with the second embodiment of the present invention.

Again, an active filter network giving the required transfer function is more readily devised than a passive filter network and an example of the active filter network is shown in FIG. 5. It will be observed that between the terminals P1 and P3 the filter network is identical to that of FIG. 3. Indeed, the same resistance, capacitance, and amplifier gain values can be used as were used in the example discussed with reference to FIG. 3. Additionally, four resistors R5, R6, R7, R8, four capacitors C5, C6, C7 and C8 and two operational amplifiers A3 and A4 are provided and connected as shown in FIG. 5, and further filter the signal appearing at terminal P3. Again the right hand side of the circuit of FIG. 5 can be subdivided in two subcircuits, one of which includes the elements between terminals P3 and P4, and the other of which includes the elements between terminal P4 and output terminal P5. The voltage output at the terminal P5 can be fed directly to the readout device 21 of FIG. 1, or special arrangements for the construction of the circuit can be made for weighing the railway car one truck at a time, to be described below with reference to FIG. 6.

It will readily be observed that the subcircuit between terminals P3 and P4 is identical in form to that appearing between terminals P2 and P3. Indeed, as might be expected, since two additional poles are to be provided at a frequency $\omega_o = 20$ radians per second as required by the transfer function equation (2), the resistance and capacitance values of the subcircuit between terminals P3 and P4 can be identical to the corresponding values of the subcircuit components between terminals P2 and P3.

The subcircuit between terminals P4 and P5 gives 2 zeros and 2 poles at 30 radians per second, provided that the circuit values are chosen as follows:

Resistance of resistor R7 = 165 K$\Omega$.
Resistance of resistor R8 = 66.5 K$\Omega$.
Capacitance of capacitor C7 = 0.01 $\mu f$.
Capacitance of capacitor C8 = 10 $\mu f$.
Gain of amplifier A4 = 0.9614.

With the circuit of FIG. 5, the transient response is such that after 0.95 seconds have elapsed, the error is an acceptable 0.11 percent and after 1.15 seconds is less than 0.014 percent. The oscillatory component rejection is such that a maximum 0.73 percent of the input oscillatory component is passed by the filter, which is less than 0.15 percent of the true weight if the bounce is a maximum 20 percent of the true weight. The circuit of FIG. 5 requires no additional simple integration stage and therefore the total scale-borne time can be less than 1 second.

Furthermore, the ratio of true weight to the apparent weight after about 0.8 seconds scale-borne time is sufficiently constant that it has been found that the reading at 0.8 seconds can be multiplied by a constant factor (empirically derived for any particular weighing apparatus) to give the true weight within the required accuracy.

The section of poles and zeros at 20 radians and 30 radians per second was a selection based upon railway car weighing considerations, both technical considerations such as the empirically established lowest bounce frequency found always to be lower than 20 radians per second, and nontechnical considerations such as the common North American railway requirement that the output dynamic weight reading correspond to the true static weight within 0.15 percent. In approaching the problem, an attempt was made to minimize the time required for the railway car to be present on the weigh bridge, and thus to minimize the length and thus the cost of the weigh bridge required. Obviously other considerations might dictate the choice of somewhat different constants, such as the values of $a$ and $b$ in equations (1) and (2), or might even dictate the choice of poles and zeros at different frequencies. Generally speaking, if the rejection of the oscillatory component of the dynamic weight signal under steady state conditions is improved by the selection of a different set of poles and zeros, the transient response tends to be somewhat worse, and vice versa. However, it will be observed that the specific transfer functions discussed above are adequate for the weighing of vehicles having lowest bounce frequencies of considerably greater than 20 radians per second, and the stated transient dissipation and oscillatory component rejection will be found to be substantially as stated above.

Obviously, any filter chosen must be able to pass a d.c. signal without attenuation, or multiplied by a known constant, so that the static weight will be accurately recorded.

The filters of either FIG. 3 and FIG. 5 could have additional states establishing poles and zeros at higher frequencies, if desired, but the slightly greater oscillatory component rejection is not considered to be sufficient to offset the increased complication of the circuitry.

Figure 6:
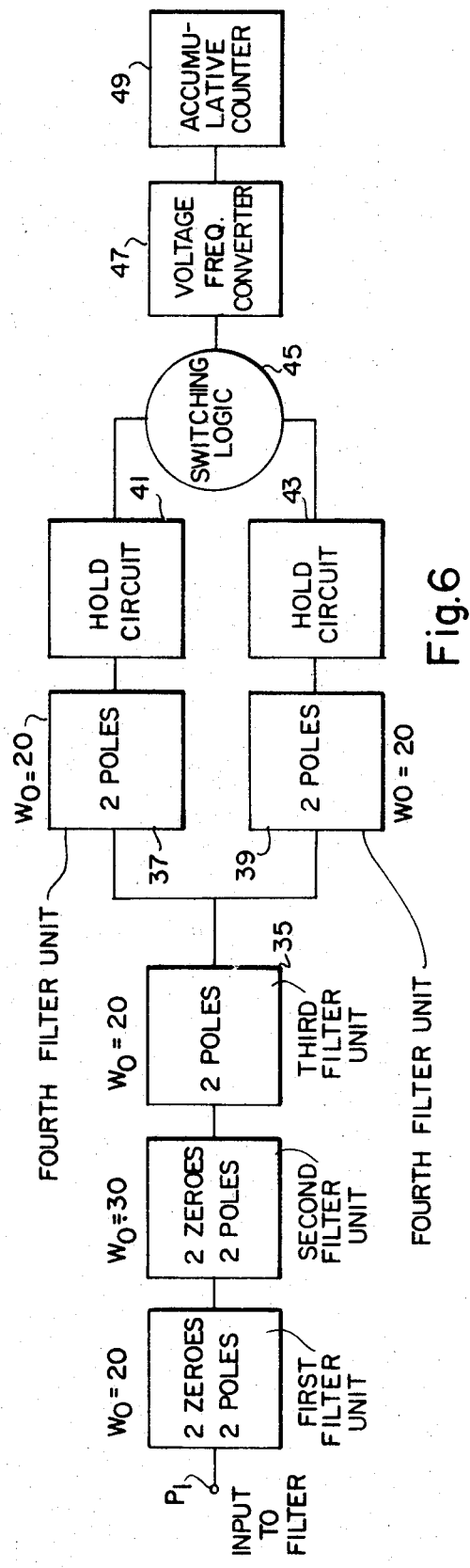
FIG. 6 is a schematic block diagram of apparatus according to the invention for determining the weight of a railway car by weighing one supporting truck at a time and adding the two results.

Provided that the railway car being weighed is on a flat surface or on an incline of constant slope throughout the weighing procedure, it is satisfactory to obtain the weight of the railway car by measuring the weight of one truck at a time as each truck passes over the weigh bridge. The total weight of the car is then simply the sum of the two truck weights obtained. However, in order to avoid the necessity of human addition, a circuit can be devised, using the dynamic weighing techniques and apparatus according to the present invention, which will automatically add the two truck weights to obtain the total weight of the railway car. Such apparatus is illustrated in FIG. 6. The output of the amplifier is applied to input terminal P1, and passed to three subcircuits 31, 33, 35, corresponding respectively to the first, fourth and second subcircuits (looking from left to right) shown in FIG. 5. (Obviously, it does not matter in what order the subcircuits are connected since each subcircuit operates on the output of the immediately proceeding circuit, and the operations are commutative.)

Instead of having a single final subcircuit corresponding to the third subcircuit in FIG. 5, two fourth filter units 37 and 39, each corresponding to the third subcircuit of FIG. 5, are provided. Each of the filter units 37, 39 receives the output of the third filter unit 35. The output of each of the final filter units 37 and 39 is passed to an associated hold circuit 41, 43 respectively. Switching logic circuitry 45 is provided to render operative hold circuit 41 or hold circuit 43 and to channel selectively the output of each of the hold circuits 41 and 43 to a voltage-frequency converter 47. The output of the voltage-frequency converter is in turn supplied to an accumulative counter 49. The characteristics of the voltage-frequency converter are adjusted to be such that the accumulative counter 49 records the output frequency of the converter 47 in direct units of weight such as tons, pounds, kilograms, or as the case may be. The voltage to frequency converter and counter, may, of course, be replaced by any suitable digitizing voltmeter.

The operation of the circuit of FIG. 6 is as follows:

The dynamic weight signal of the first truck of the railway car is applied to the terminal P1 and filtered by the first, second, and third filter units and then passed to each of the fourth (final) filter units 37 and 39. Switching logic circuitry 45 actuates the hold circuit 41 after the lapse of 1 second (say) and the hold circuit 41 maintains the signal appearing at the output of the fourth filter unit 37 indefinitely. The signal if then applied by the switching logic network 45 to the converter 47 and the accumulative counter 49 gives a reading which is a direct reading of the weight of the first truck in appropriate units.

Before the weighing of the next truck by the railway bridge, the switching logic network 45 cuts off the connection between the hold circuit 41 and the converter 47. The next truck of the railway car then passes onto the weigh bridge and after one second of weighing (say) the switching logic network 45 signals hold circuit 45 to hold the output signal appearing at the output of final filter unit 39. The output of this circuit will of course correspond linearly to the weight of the second truck of the railway car and this output is held by the hold circuit 43 and then applied by the switching logic 45 to the voltage frequency converter 47. The new frequency output of the converter 47 is again applied to the counter 49, but instead of appearing as a new reading is automatically added to the reading already stored in the accumulative counter 49, because of its accumulative characteristics. The total reading on the counter 49 thus represents the total weight of the entire railway car, measured one truck at a time. Following the weighing of one car in this manner the counter 49 can be reset to zero, and the switching logic cycle can begin again for the weighing of the next following railway car.

The switching logic operations are within the ordinary skill of a person familiar with computer circuits, and in any event are not considered per se to be part of the subject matter of the present invention.

The selection of the two-pole filter unit as the unit to be duplicated as the final filter unit of the circuit of FIG. 6 was of course completely arbitrary; any one of the four subcircuits of FIG. 5 could have been selected as the subcircuit to be duplicated as the final filter unit. Equally obviously, more than one of the filter units could be duplicated but this would simply add expense without obtaining any compensating advantage.

While specific examples of apparatus and techniques according to the invention have been described above with particular reference to the weighing of railway cars, it will be obvious to those skilled in the art that the invention is not so limited. The appended claims are intended to define the limits of the applicant's invention.

I claim:

1. In or for use with dynamic weighing apparatus of the type providing an analogue signal representative of the instantaneous weight of a moving object, a filter for filtering the analogue signal and characterized by a transfer function having a least one pair of zeros at or slightly below the lowest expected resonant bounce frequency of the system including the moving object and the weighing apparatus.

2. Apparatus as defined in claim 1 wherein the transfer function is characterized by at least four poles at or slightly below the said lowest expected resonant frequency.

3. Apparatus as defined in claim 2 wherein the transfer function is additionally characterized by at least two zeros at a frequency higher than the said lowest expected resonant frequency.

4. Apparatus as defined in claim 3 wherein the said last mentioned zeros are at about 1½ times the frequency of the said lowest resonant frequency.

5. Apparatus as defined in claim 2 wherein the lowest resonant frequency is about 20 radians per second.

6. Apparatus as defined in claim 1 wherein the transfer function is in the form $$\frac{e_2}{e_1} = \frac{K_1\left(\frac{D^2}{\omega_o^2} + a\frac{D}{\omega_o} + 1\right)}{\left(\frac{D}{\omega_o} + 1\right)^4} \quad (1)$$

where $K_1$ is a known constant;
$e_2$ is the filter output voltage;
$e_1$ is the filter input voltage;
D is the differential operator;
$a$ is a constant having a value of about 0.1 or less; and
$\omega_o$ is the lowest expected resonant bounce frequency (in radians per second) or is slight below the lowest expected resonant bounce frequency.

7. Apparatus as defined in claim 6 wherein $\omega_o$ is of the order of 20 radians per second.

8. Apparatus as defined in claim 7 wherein $a$ is of the order of 0.07.

9. Apparatus as defined in claim 1 wherein the transfer function is of the form:

$$\frac{e_2}{e_1} = \frac{K_2\left(\frac{D^2}{\omega_o^2} + a\frac{D}{\omega_o} + 1\right)\left(\frac{D^2}{\omega_1^2} + b\frac{D}{\omega_1} + 1\right)}{\left(\frac{D}{\omega_o} + 1\right)^6\left(\frac{D}{\omega_1} + 1\right)^2} \quad (2)$$

where $K_2$ is a known constant;
$e_2$ is the filter output voltage;
$e_1$ is the filter input voltage;
D is the differential operator;
$\omega_o$ is the lowest resonant bounce frequency in radians per second, or is slightly below the lowest expected resonant bounce frequency;
$\omega_1$ is a frequency of about 1½ times $\omega_o$; and $a$ and $b$ are constants each having a value of about 0.1 or less.

10. Apparatus as defined in claim 9 where $\omega_o$ is of the order of 20 radians per second and $\omega_1$ is of the order of 30 radians per second.

11. Apparatus as defined in claim 10 wherein $a$ and $b$ each are of the order of 0.07.

12. Dynamic weighing apparatus comprising a weigh bridge for weighing a moving object, load cells associated with the weigh bridge and developing an electrical signal which is the analogue of the instantaneous dynamic weight of the moving object, a filter responsive to said analogue signal and characterized by a transfer function of the form $$\frac{e_2}{e_1} = \frac{K_1\left(\frac{D^2}{\omega_o^2} + a\frac{D}{\omega_o} + 1\right)}{\left(\frac{D}{\omega_o} + 1\right)^4} \quad (1)$$

where $K_1$ is a known constant;
$e_2$ is the filter output voltage;
$e_1$ is the filter input voltage;
D is the differential operation;
$a$ is a constant having a value of about 0.1 or less; and
$\omega_o$ is the lowest expected resonant bounce frequency (in radians per second) or is slightly below the lowest expected resonant bounce frequency; an integrator for integrating the output voltage of the filter, and indicating means responsive to the output of the integrator for indicating the static weight of the moving object.

13. Apparatus as defined in claim 12, wherein the said analogue signal is amplified before being passed through the filter.

14. Apparatus as defined in claim 12 $\omega_o$ is of the order of 20 radians per second.

15. Apparatus as defined in claim 14 wherein $a$ is of the order of 0.07.

16. Dynamic weighing apparatus for obtaining the static weight of a moving object, comprising a weigh bridge over which the object passes, load cells associated with the weigh bridge for developing an analogue signal representative of the instantaneous dynamic weight of the object, means responsive to the analogue signal for filtering the signal, said filtering means being characterized by a transfer function of the form:

$$\frac{e_2}{e_1} = \frac{K_2\left(\frac{D_2}{\omega_o^2} + a\frac{D}{\omega_o} + 1\right)\left(\frac{D_2}{\omega_o^2} + b\frac{D}{\omega_1} + 1\right)}{\left(\frac{D}{\omega_o} + 1\right)^6\left(\frac{D}{\omega_1} + 1\right)^2} \quad (2)$$

where $K_2$ is a known constant;
$e_2$ is the filter output voltage;
$e_1$ is the filter input voltage;
D is the differential operator; $\omega_o$ is the lowest resonant bounce frequency in radians per second, or is slightly below the lowest expected resonant bounce frequency;
$a$ and $b$ are constants having a value of about 0.1 or less;
$\omega_1$ is a frequency of about 1½ times $\omega_o$; and indicating means responsive to the filter output voltage for providing an indication of the signal after passing through the filter for a predetermined time.

17. Apparatus as defined in claim 16 wherein the predetermined time is of the order of 1 second.

18. Apparatus as defined in claim 17, where $\omega_o$ is of the order of 20 radians per second and $\omega_1$ is of the order of 30 radians per second.

19. Apparatus as defined in claim 18 wherein $a$ and $b$ each are of the order of 0.07.

20. A method of measuring the weight of a moving object, comprising obtaining an analogue signal representative of the instantaneous dynamic weight of the object, and filtering the analogue signal so as to apply to the signal an operation characterized by the following transfer function:

$$\frac{e_2}{e_1} = \frac{K_1\left(\frac{D^2}{\omega_o^2} + a\frac{D}{\omega_o} + 1\right)}{\left(\frac{D}{\omega_o} + 1\right)^4} \quad (1)$$

where $K_1$ is a known constant:
$e_2$ is the filter output voltage;
$e_1$ is the filter input voltage;
D is the differential operator;
$a$ is a constant having a value of about 0.1 or less; and
$\omega_o$ is the lowest expected resonant bounce frequency (in radians per second) or is slightly below the lowest expected resonant bounce frequency; integrating the filter output voltage, and reading out the signal after the filtering operation is completed.

21. A method as defined in claim 20, wherein $\omega_o$ is of the order of 20 radians per second.

22. A method as defined in claim 21 wherein $a$ is of the order of 0.07.

23. A method of measuring the weight of a moving object, comprising obtaining an analogue signal representative of the instantaneous dynamic weight of the object, and filtering the analogue signal so as to apply to the signal an operation characterized by the following transfer function:

$$\frac{e_2}{e_1} = \frac{K_2\left(\frac{D^2}{\omega_o^2} + a\frac{D}{\omega_o}\right)\left(\frac{D^2}{\omega_o^2} + b\frac{D}{\omega_1} + 1\right)}{\left(\frac{D}{\omega_o} + 1\right)^6\left(\frac{D}{\omega_1} + 1\right)^2} \quad (2)$$

where $K_2$ is the known constant;
$e_2$ is the filter output voltage;
$e_1$ is the filter input voltage;
D is the differential operator;
$\omega_o$ is the lowest resonant bounce frequency in radians per second, or is slightly below the lowest expected resonant bounce frequency;
$\omega_1$ is a frequency of about 1½ times $\omega_o$: and
$a$ and $b$ are constants each having a value of about 0.1 or less; and reading out the signal after the filtering operation is completed.

24. A method as defined in claim 23 where $\omega_o$ is of the order of 20 radians per second and $\omega_1$ is of the order of 30 radians per second.

25. A method as defined in claim 24 wherein $a$ and $b$ each are of the order of 0.07.